United States Patent [19]

Sydansk

[11] Patent Number: 4,744,418

[45] Date of Patent: * May 17, 1988

[54] DELAYED POLYACRYLAMIDE GELATION PROCESS FOR OIL RECOVERY APPLICATIONS

[75] Inventor: Robert D. Sydansk, Littleton, Colo.

[73] Assignee: Marathon Oil Company, Findlay, Ohio

[*] Notice: The portion of the term of this patent subsequent to Aug. 4, 2004 has been disclaimed.

[21] Appl. No.: 939,660

[22] Filed: Dec. 9, 1986

Related U.S. Application Data

[63] Continuation-in-part of Ser. No. 822,709, Jan. 27, 1986, Pat. No. 4,683,949, which is a continuation-in-part of Ser. No. 807,416, Dec. 10, 1985, abandoned.

[51] Int. Cl.$^4$ .................... E21B 33/138; E21B 43/26
[52] U.S. Cl. .................................. 166/270; 166/294; 166/295; 166/308; 252/8.551; 523/130
[58] Field of Search ............... 166/270, 271, 294, 295, 166/300, 308; 252/8.551; 405/264; 523/130, 132

[56] References Cited

U.S. PATENT DOCUMENTS

| | | | |
|---|---|---|---|
| Re. 32,114 | 4/1986 | Argabright et al. | 166/252 |
| 2,248,028 | 7/1941 | Prutton | 166/295 |
| 3,114,651 | 12/1963 | Gentile et al. | 117/6 |
| 3,302,717 | 2/1967 | West et al. | 166/295 X |
| 3,306,870 | 2/1967 | Eilers et al. | 166/295 X |
| 3,383,307 | 5/1968 | Goetz | 252/316 |
| 3,504,746 | 4/1970 | Freifeld et al. | 166/295 |
| 3,658,129 | 4/1972 | Lanning et al. | 166/270 |
| 3,749,172 | 7/1973 | Hessert et al. | 166/295 X |
| 3,762,476 | 10/1973 | Gall | 166/294 |
| 3,833,061 | 9/1974 | Gall | 166/294 |
| 3,926,258 | 12/1975 | Hessert et al. | 166/294 |
| 3,938,594 | 2/1976 | Rhudy et al. | 166/308 |
| 3,949,811 | 4/1976 | Threlkeld et al. | 166/294 |
| 3,978,928 | 9/1976 | Clampitt | 166/294 |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,069,869 | 1/1978 | Sandiford | 166/270 |
| 4,193,453 | 3/1980 | Golinkin | 166/295 |
| 4,488,601 | 12/1984 | Hammett | 166/270 |
| 4,498,539 | 2/1985 | Bruning | 166/294 |
| 4,606,407 | 8/1986 | Shu | 166/270 |
| 4,644,073 | 2/1987 | Mumallah et al. | 252/8.554 X |
| 4,683,949 | 8/1987 | Sydansk et al. | 166/270 |

OTHER PUBLICATIONS

Von Erdman, "Condensation of Mononuclear Chromium (III) Salts to Polynuclear Compounds," *Das Leder*, Eduard Roether Verlag, Darmstadt, Germany, 1963, vol. 14, pp. 249-266.

Udy, Marvin J., Chromium, vol. 1: *Chemistry of Chromium and Its Compounds*, Reinhold Publishing Corp., N.Y., 1956, pp. 229-233.

Cotton and Wilkinson, *Advanced Inorganic Chemistry* 3rd Ed., John Wiley & Sons, Inc., N.Y., 1972, pp. 836-839.

Shuttleworth and Russel, *Journal of the Society of Leather Trades' Chemists*, "The Kinetics of Chrome Tannage Part I., " United Kingdom, 1965, vol. 49, pp. 133-154.

Shuttleworth and Russel, *Journal of the Society of Leather Trade's Chemists*, "Part III.," United Kingdom, 1965, vol. 49, pp. 251-260.

Shuttleworth and Russel, *Journal of the Society of Leather Trades' Chemists*, "Part IV.," United Kingdom, 1965, vol. 49, pp. 261-268.

*Primary Examiner*—George A. Suchfield
*Attorney, Agent, or Firm*—Jack L. Hummel; Rodney F. Brown

[57] ABSTRACT

A process for delaying the gelation rate of a polymer used in oil recovery applications. A gel is prepared by mixing a single aqueous gelation solution at the surface made up of a polyvalent metal cross-linking agent and a polyacrylamide having no hydrolysis or only a limited degree of hydrolysis. The solution is injected into a desired treatment region and gelled to completion in situ.

30 Claims, 3 Drawing Sheets

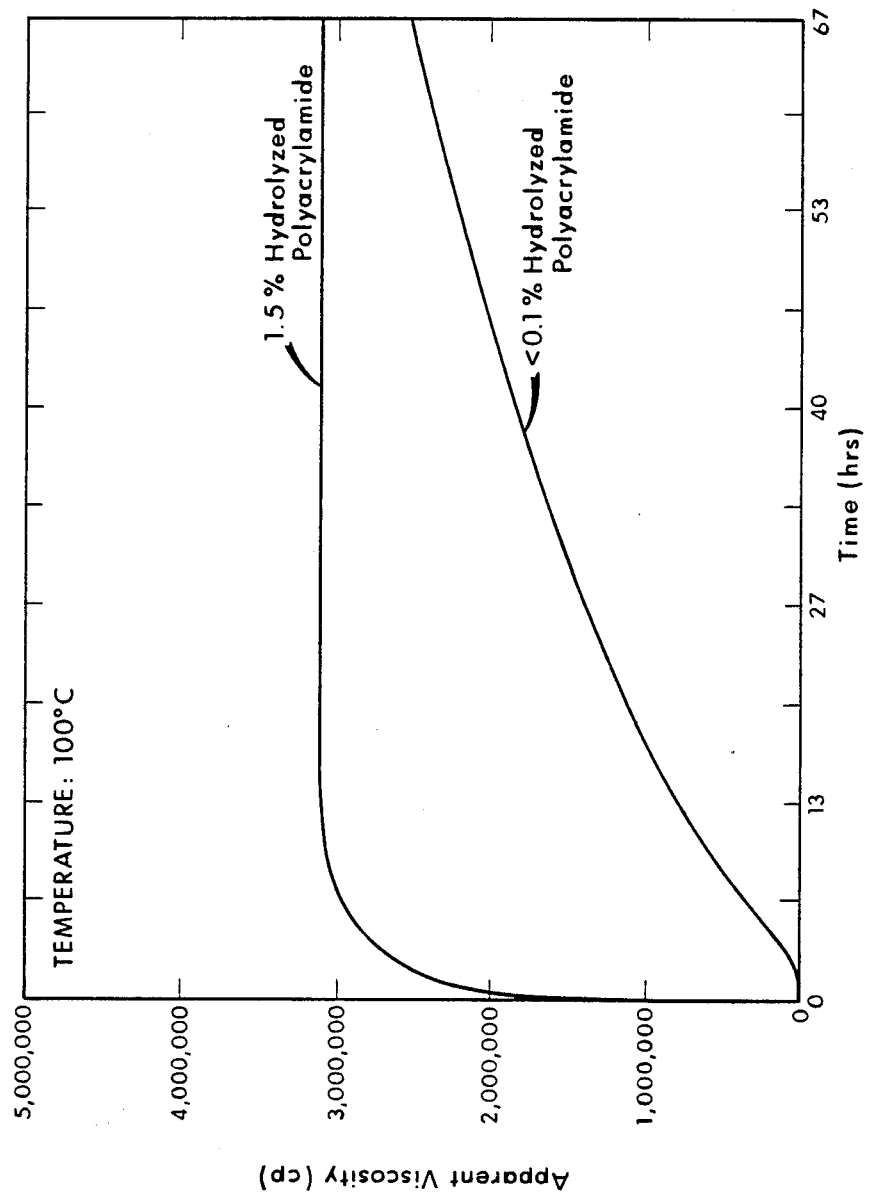

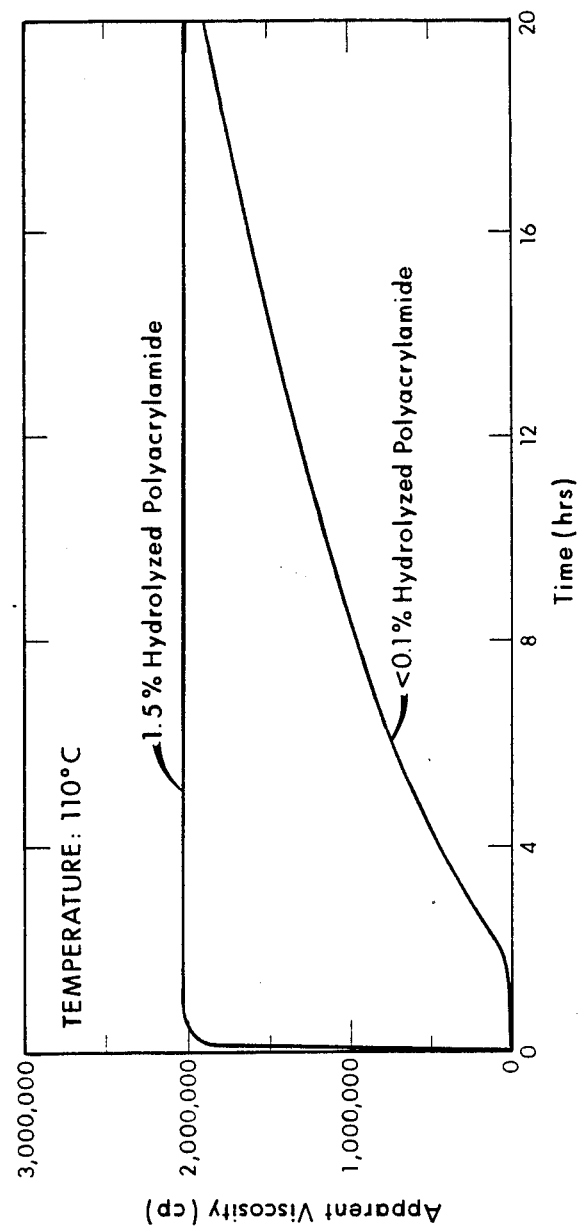

DELAYED POLYACRYLAMIDE GELATION PROCESS FOR OIL RECOVERY APPLICATIONS

This is a continuation-in-part application of copending application Ser. No. 822,709 filed on Jan. 27, 1986, now U.S. Pat. No. 4,683,944, which is a continuation-in-part application of application Ser. No. 807,416 filed on Dec. 10, 1985, now abandoned.

BACKGROUND OF THE INVENTION

1. Technical Field

The invention relates to an oil recovery process and more particularly to a process of preparing a delayed polymer gel for oil recovery applications.

2. Description of Related Art

Polymer gels have potential application to a number of oil recovery processes including cementing, fracturing and conformance improvement. Poor vertical conformance results from the vertical juxtaposition of relatively high permeability geologic regions to relatively low permeability regions within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean wellbore across which fluids are injected or produced.

A number of attempts to remedy conformance problems exist. U.S. Pat. Nos. 3,762,476; 3,981,363; 4,018,286; and 4,039,029 to Gall or Gall et al describe various processes wherein gel compositions are formed in high permeability regions of subterranean formations to reduce the permeability therein. According to U.S. Pat. No. 3,762,476, a polymer such as polyacrylamide is injected into a formation followed sequentially by a crosslinking agent. The sequentially injected slugs are believed to permeate the treatment region of the formation and gel in situ.

It is generally held that effective polymer/crosslinking agent systems necessitate sequential injection of the gel components followed by in situ mixing because gel systems mixed on the surface are difficult to regulate. Systems mixed on the surface often gel at an excessive rate, forming gel balls before they can effectively penetrate the treatment region. However, in practice, conformance treatments such as that disclosed in U.S. Pat. No. 3,762,476 using sequentially injected gel systems have also proven unsatisfactory because of the inability to achieve complete mixing and gelation in the formation. As a result, gels only form at the interface of the unmixed gel components and often in regions remote from the desired treatment region. Likewise, processes employing sequentially injected gel systems for cementing and fracturing applications have proven unsatisfactory because the resulting gels do not have sufficient strength and integrity to withstand the stresses encountered in oil recovery processes.

A need exists for a gelation process wherein the gelation solution gels at a controllable, delayed rate, even at high temperatures. A need exists for a process wherein gelation of the polymer is substantially delayed until the gelation solution penetrates the desired treatment region of a subterranean hydrocarbon-bearing formation and sets up thereafter as an effective uniform gel. A need exists for a gelation process which can produce a range of versatile gels having the desired predetermined strengths and integrities for conformance-improving, cementing, or fracturing applications.

SUMMARY OF THE INVENTION

The present invention provides a process for improving hydrocarbon recovery from a subterranean hydrocarbon-bearing formation penetrated by a production and/or injection well. According to one embodiment, the process improves vertical and areal conformance in the formation and correspondingly improves flow profiles and sweep efficiencies of injected and/or produced fluids in the formation. According to another embodiment, the process provides a strong, permanent material for cementing jobs. According to yet another embodiment, the process provides an effective fluid for formation fracturing. These objectives and others are achieved by a polymer gelation process employing a polyvalent metal crosslinking agent and a high molecular weight, water-soluble polyacrylamide, which is substantially unhydrolyzed or has only a limited degree of hydrolysis.

The process comprises preparing a single aqueous gelation solution at the surface containing the polyacrylamide and the crosslinking agent. The resulting gelation solution is injected into a desired subterranean region where it gels to completion in situ. The present invention enables the practitioner to control the gelation rate or time required for complete gelation by limiting the degree of hydrolysis in the polyacrylamide. The degree of hydrolysis is selected according to the desired hydrocarbon recovery application, i.e., fracturing, cementing or conformance improvement, and the specific demands of the subterranean formation.

The resultant gel is a viscous continuous single-phase composition comprised of the polymer and crosslinking agent. Once the gel is in place for its desired function or backflushed in the case of formation fracturing, fluids may be injected into or produced from the hydrocarbon-bearing regions of the formation in fluid communication with the wellbore. The gel in place is substantially incapable of flowing from the treatment region and is substantially permanent and resistant to in situ degradation.

The process provides distinct advantages over known gelation processes. The practitioner of the present invention can fully prepare and mix a single gelation solution at the surface to achieve a controlled gelation rate. The practitioner predetermines a specific desired gelation rate by selecting the value of one relatively independent parameter, degree of hydrolysis in the polyacrylamide, without substantially altering the majority of gelation parameters. The resultant gel has sufficient strength and stability to meet the demands of the formation and the specific hydrocarbon recovery process employed.

Although the gelation rate can be predetermined by varying other gelation parameters as disclosed in copending U.S. application Ser. No. 822,709, controlling the degree of hydrolysis in the polyacrylamide may be economically and/or operationally more attractive. Since other gelation parameters are functionally correlated to final gel properties such as gel strength and stability, varying these parameters to achieve a given gelation rate could adversely effect the final gel properties. The present process allows one to set the gelation rate as a function of only one gelation parameter without substantially altering the final gel properties.

The present invention is especially applicable to the treatment of high temperature formations which are greater than 38° C. and in certain cases even greater than 100° C. As a rule, the gelation rate of a gelation solution increases with increasing temperature. The present invention enables one to sufficiently delay the gelation of a gelation solution, even in a high temperature formation, so that the solution can be placed in the treatment region before setting up.

BRIEF DESCRIPTION OF DRAWINGS

FIGS. 1, 2 and 3 are graphs showing the functional relationship between the gelation rate and the degree of hydrolysis in the polyacrylamide.

DESCRIPTION OF PREFERRED EMBODIMENTS

Figure 1:
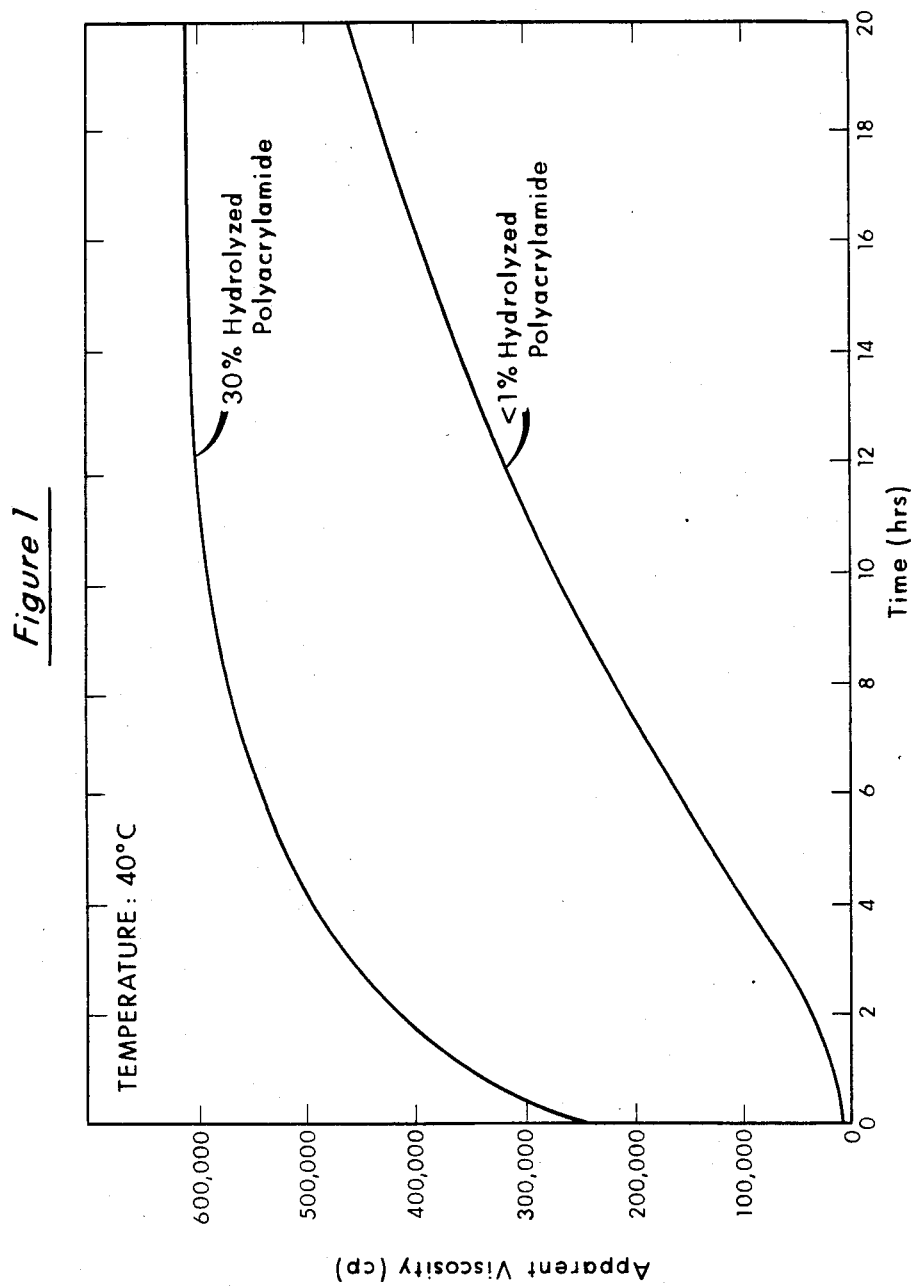

The present invention is described in the context of specific terms which are defined as follows. The formation consists of two general regions, the "matrix" and "anomalies." An "anomaly" is a volume or void space in the formation having very high permeability relative to the matrix. It is inclusive of terms such as streaks, fractures, fracture networks, vugs, solution channels, caverns, washouts, cavities, etc. The "matrix" is substantially the remainder of the formation volume characterized as essentially homogeneous, continuous, sedimentary reservoir material free of anomalies and often competent.

The matrix consists of horizontal "zones" of distinctive subterranean material of continuous geologic properties which extend in the horizontal direction. "Vertical conformance" is a measure of the degree of geologic uniformity in permeability as one moves vertically across the formation. "Areal conformance" is a measure of the degree of geologic uniformity in permeability as one moves horizontally across the formation. A "flow profile" qualitatively describes the uniformity of fluid flow through a subterranean formation while "sweep efficiency" is the quantitative analog of "flow profile." "Plugging" is a substantial reduction in permeability in a region of a formation.

The term "gel" as used herein is directed to a continuous three-dimensional crosslinked polymeric network having an ultra high molecular weight. The gel contains a liquid medium such as water which is confined within the solid polymeric network. The fusion of a liquid and a solid component into a single-phase system provides the gel with a unique phase behavior. Gels employed by the present invention have sufficient structure so as not to propagate from the confines of a plugged region into a less permeable region of the formation adjoining the plugged region once in place.

The gel is qualitatively defined as "flowing" or "non-flowing" based on its ability to flow under the force of gravity when unconfined on the surface at ambient atmospheric conditions. A flowing gel flows under these conditions; a non-flowing gel does not. Nonetheless, both a non-flowing gel and a flowing gel are defined herein as having sufficient structure so as not to propagate from the confines of the desired treatment region when injected therein.

"Partially gelled" solutions are also referred to herein. A partially gelled solution is at least somewhat more viscous that an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer with the result that neither all of the polymer nor all of the crosslinking agent in the gelation solution is totally consumed by the crosslinking reaction. The partially gelled solution is capable of further crosslinking to completion resulting in the desired gel without the addition of more crosslinking agent.

"Crosslinked to completion" means that the gel composition is incapable of further crosslinking because one or both of the required reactants in the initial solution are consumed. Further crosslinking is only possible if either polymer, crosslinking agent, or both are added to the gel composition.

The term "polyacrylamide", when used without qualification, generally encompasses both partially hydrolyzed and substantially unhydrolyzed acrylamide polymers. However, the "polyacrylamide" employed in the present invention is qualified as having no more than a limited degree of hydrolysis, i.e., substantially unhydrolyzed (defined as less than 1% hydrolyzed) or having only a limited degree of hydrolysis. Thus, the polyacrylamide of the present invention has less than about 5.0% of the amide groups hydrolyzed to carboxylate groups, preferably less than about 3.5%, and most preferably less than about 1.0%. At extremely high temperature, it may even be preferable to employ a polyacrylamide having less than about 0.1% of the amide groups hydrolyzed to carboxylate groups.

The polyacrylamide may be prepared according to any conventional method known in the art, but preferably has the specific molecular weight characteristics of the polyacrylamide prepared according to the method disclosed by U.S. patent Re. 32,114 to Argabright et al incorporated herein by reference. The average molecular weight of the polyacrylamide is in the range of about 10,000 to about 50,000,000 and preferably about 100,000 to about 20,000,000, and most preferably about 200,000 to about 15,000,000. The polymer concentration in the solution is about 500 ppm up to the solubility limit of the polymer in the solvent or the rheological constraints of the polymer solution and preferably about 10,000 to about 80,000 ppm.

The gel composition utilized in the present invention comprises the polyacrylamide characterized above and a polyvalent metal crosslinking agent. The polyvalent metal crosslinking agent is defined as a polyvalent metal cation ionized or complexed in an aqueous solution which is capable of crosslinking the polymer. Exemplary polyvalent metal cations useful in the practice of the present invention include $Ca^{2+}$, $Mg^{2+}$, $Ba^{2+}$, $Zn^{2+}$, $Sn^{2+}$, $Al^{3+}$, $Fe^{3+}$, $Cr^{3+}$, $Ti^{4+}$, $Zr^{4+}$, etc. The crosslinking agent is prepared by dissolving an organic or inorganic salt of the appropriate polyvalent metal in the aqueous solvent.

A preferred crosslinking agent of the present invention includes at least one or more electropositive chromium II species. The chromium III species is complexed with one or moe electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

$[Cr_3(CH_3CO_2)_6(OH)_2]^{+1}$;

$[Cr_3(OH)_2(CH_3CO_2)_6]NO_3 \cdot 6H_2O$;

$[Cr_3(H_2O)_2(CH_3CO_2)_6]^{+3}$;

$[Cr_3(H_2O)_2(CH_3CO_2)_6](CH_3CO_2)_3 \cdot H_2O$; etc.

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and lactic acid, lower substituted derivatives thereof and mixtures thereof are especially preferred. The carboxylate species include the following water-soluble species: formate, acetate, propionate, lactate, lower substituted derivatives thereof, and mixtures thereof. The optional inorganic ions include sodium, sulfate, nitrate and chloride ions.

A host of complexes of the type described above and their method of preparation are well known in the leather tanning art. These complexes are described in Shuttleworth and Russel, *Journal of The Society of Leather Trades' Chemists*, "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, *Das Leder*, "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., *Chromium, Volume 1: Chemistry of Chromium and its Compounds*, Reinhold Publishing Corp., N.Y., 1956, pp. 229–233; and Cotton and Wilkinson, *Advanced Inorganic Chemistry 3rd Ed.*, John Wiley & Sons, Inc., N.Y., 1972, pp. 836–839, further describe typical complexes which may be within the scope of the present invention and are incorporated herein by reference.

The gel is formed by admixing the polymer and crosslinking agent at the surface to form a single injectable gelation solution. Surface admixing broadly encompasses inter alia mixing the solution in bulk at the surface prior to injection or simultaneously mixing the solution at or near the wellhead by in-line mixing means while injecting it. The weight ratio of polymer to crosslinking agent is about 1:1 to 500:1, preferably about 2.5:1 to 200:1, and most preferably about 5:1 to 50:1.

The aqueous solvent of the gelation solution may be fresh water or a brine having a total dissolved solids concentration up to the solubility limit of the solids in water. Inert fillers such as crushed or naturally fine rock material or glass beads can also be added to the gelation solution to reinforce the gel network structure.

The present process enables the practitioner to produce a gel at a predetermined gelation rate as a function of the degree of polymer hydrolysis. The gelation rate is defined as the degree of gel formation as a function of time or, synonymously, the rate of crosslinking in the gelation solution. The degree of crosslinking may be quantified in terms of gel viscosity and/or strength.

The gelation rate of the gelation solution generally decreases as the degree of polymer hydrolysis decreases. However, the effect is generally observed when the degree of polymer hydrolysis is below a maximum or threshold level. The actual value of the maximum is usually not more that 7%, but may be less than that value, depending on the other fixed gelation parameters. Above the maximum value, the gelation rate appears to be relatively insensitive to varying the degree of polymer hydrolysis.

The practitioner advantageously selects a predetermined gelation rate which enables preparation of the gelation solution at the surface, injection of the solution as a single uniform slug into the wellbore, and displacement of the entire solution into the desired subterranean zone. Once in place in the desired treatment region, gelation of the solution advantageously proceeds to achieve substantially complete gelation of the solution in situ.

The present gelation mechanism enables the practitioner to design a gelation solution which can be injected into a treatment region at a desired injection rate with little resistance to injectivity. The solution is preferably gelled rapidly after it is in place in the desired subterranean region to minimize lost production from shut in of injection and/or product wells.

The present process is particularly applicable to cases where it is extremely difficult to prepare a polymer gelation solution having a favorable gelation rate under formation conditions. For example, formation temperatures as low as 38° C. at the depth of the treatment region can cause premature gelation of a polymer gelation solution in the wellbore and subsequent undesired plugging of portions of the formation, wellbore, or wellbore face. By employing a polyacrylamide having no more than a limited degree of hydrolysis in the gelation solution, gelation can be delayed to a sufficient degree which enables the solution to be placed in a high temperature treatment region while the gel is still mobile.

The process is also applicable to cases where specific crosslinking agents, such as chromic chloride or chromic nitrate, gel conventional partially hydrolyzed polyacrylamide (PHPA), i.e., about 30% hydrolyzed, at uncontrollably rapid rates even at temperatures below 38° C. Uncontrolled crosslinking can result in the formation of local gel balls around the crosslinking agent as it is added to the polymer solution, which prevents effective mixing and continuous gel formation. Substitution of the PHPA with a polyacrylamide having no more than a limited degree of hydrolysis enables one to produce a uniform gel at a controlled rate with the same previously ineffective crosslinking agent.

The gelation rate can generally be delayed such that complete gelation does not occur for up to about 24 hours or more from the time the gelation solution is formulated and injected using the present process. Even under extremely unfavorable in situ conditions, the gelation rate can be delayed such that complete gelation does not occur for at least 1 to 48 hours or more and preferably at least 6 to 24 hours by careful formulation of the gel.

The present process is applicable to a number of hydrocarbon recovery applications. According to one embodiment, the process is applicable to conformance treatment of formations under most conditions and is specific to treating regions within the formation which are in fluid communication with an injection or production well. The flowing gel is especially applicable to the treatment of anomalies such as streaks of relatively high permeability, fractures or fracture networks in direct communication via the anomaly with an injection well but not also in direct communication via the anomaly with a production well. The ultimate gel is termed a flowing gel as defined herein because it would flow if unconfined on the surface. However, the flowing gel is sufficiently crosslinked to remain in place under injection conditions in the anomaly when confined thereby. Thus, the flowing gel is capable of effectively plugging the anomaly.

The flowing gel is not generally suitable for treatment of anomalies in direct communication via the anomaly with production wells because flowing gels do not have sufficient strength to withstand the drawdown pressure during production and may flow back into the wellbore. For treatment of anomalies in direct communication with production wells, non-flowing rigid gels having sufficient strength to withstand the production drawdown pressure are preferred. It is preferred that substantially none of the gel flows back into the wellbore when oil is produced after the conformance treatment.

In some specialized cases, the solution can be injected into a selected high permeability zone of the matrix and crosslinked to completion in situ as either a non-flowing gel or a flowing gel. Both flowing and non-flowing gels can be used for treatment of high permeability zones of the matrix because in general neither will flow from the treatment zone upon complete gelation, a necessary condition for the present invention. However, non-flowing gels are often preferred for treatment of high permeability zones in direct communication with production wells because of their increased strength.

Conformance treatment of regions in direct communication with a production well by the process of the present invention can effectively improve the hydrocarbon productivity of the well and/or decrease the water to hydrocarbon ratio of the produced fluids.

According to another embodiments, the present process is applicable to cementing and fracturing operations. The gelation solution is prepared in the manner described above and applied according to conventional cementing or fracturing methods known in the art. The non-flowing rigid gel produced according to the present invention is the preferred cement composition for cementing jobs. The composition is particularly applicable to remedial squeeze-cementing jobs which can also effectively improve the hydrocarbon productivity of a production well and/or decrease the water to hydrocarbon ratio of the produced fluids. The cement composition is also applicable to plugging abandoned wells. The flowing gel produced according to the present invention is the preferred fracturing fluid.

The following examples demonstrate the practice and utility of the present invention but are not to be construed as limiting the scope thereof.

Most of the examples are formatted as tables of data which describe the formulation and maturation of one or more gels. Each gel is represented in a table by a single experimental run. Data include the conditions for producing the gel and the quantitative or qualitative strength of the produced gel. The tables display data in a three-tier format. The first tier is the values of the fixed gelation conditions which are constant and common to every run in the table. The second tier is values of the gelation conditions which vary among the different runs in the table but are constant for any given run. The third tier is the gel strength which varies as a function of time within each run. Qualitative gel strength is expressed in alphabetic code. Quantitative gel strength is simply the numerical value of apparent viscosity.

The following gel strength code and nomenclature are useful for interpreting the tables.

Gel Strength Code

A. No detectable continuous gel formed: the bulk of the gelation solution appears to have the same viscosity as the original polymer solution although in some cases isolated highly viscous gel balls may be present.
B. Highly flowing gel: the gel appears to be only slightly more viscous than the initial polymer solution.
C. Flowing gel: most of the gel flows to the bottle cap by gravity upon inversion.
D. Moderately flowing gel: only a small portion (5–10%) of the gel does not readily flow to the bottle cap by gravity upon inversion (usually characterized as a tonguing gel).
E. Barely flowing gel: the gel can barely flow to the bottle cap and/or a significant portion (>15%) of the gel does not flow by gravity upon inversion.
F. Highly deformable nonflowing gel: the gel does not flow to the bottle cap by gravity upon inversion.
G. Moderately deformable nonflowing gel: the gel deforms about half way down the bottle by gravity upon inversion.
H. Slightly deformable nonflowing gel: only the gel surface slightly deforms by gravity upon inversion.
I. Rigid gel: there is no gel surface deformation by gravity upon inversion.
J. Ringing rigid gel: a tuning fork-like mechanical vibration can be felt upon tapping the bottle.

Nomenclature

Crosslinking Agent: Polyvalent metal salt used in preparation of ionized or complexed crosslinking agent.
% Hydrolysis: % of carboxylate groups on the polyacrylamide molecule based on the total number of amide groups
Polymer MW: average molecular weight of the polyacrylamide
Polymer Conc: polyacrylamide concentration in the polymer solution (ppm)
Polymer pH: pH of the polymer solution
Total Ion Conc: total concentration of crosslinking agent ions in the gelation solution (ppm)
Weight Ratio Polymer:Ions: weight ratio of polyacrylamide to crosslinking agent ions in the gelation solution
Metal Ion Conc: polyvalent metal cation concentration in the gelation solution
Temp: gelation temperature (°C.)
Time: gelation time (hr)
Gel Code: gel strength code
Viscosity: apparent viscosity of the gelation solution (cp)
Pressure: viscometer pressure (kPa)

The polymer solutions of the following examples are prepared by diluting aqueous polyacrylamide solutions with a fresh water solvent, i.e., Denver tap water. Where qualitative data are obtained, the dilute polymer solution is combined with a crosslinking agent solution in a 0.12 liter widemouth bottle to form a 0.05 liter sample. The sample is gelled in the capped bottle and the qualitative gel strength is determined by periodically inverting the bottle.

Where quantitative data are obtained, the polymer solution and crosslinking agent solution are combined in a variable pressure and temperature rheometer (viscometer), having an oscillatory mode of 0.1 rad/sec and 100% strain. The apparent viscosity at a shear rate of about 0.1 sec$^{-1}$ is recorded as a function of time.

EXAMPLE 1

| Crosslinking Agent: | $Al_2(SO_4)_3$ |
| --- | --- |
| % Hydrolysis: | 0.6 |
| Polymer MW: | 5,000,000 |
| Polymer Conc: | 20,000 |
| Polymer pH: | 6.0 |
| Temp: | 60 |

| | Run Number | | | |
| --- | --- | --- | --- | --- |
| | 1 | 2 | 3 | 4 |
| Weight Ratio Polymer:Ions | 3 | 9 | 27 | 81 |
| Time | Gel Code | | | |
| 0. | C | C | C | C |
| 0.25 | C | C | C | C |
| 0.50 | C | C | D | D |
| 1.0 | C | C | D | D |
| 2.0 | C | C | D | D |
| 3.0 | C | C | D | D |
| 4.0 | C | C | D | D |
| 5.0 | C | C | D | D |
| 6.0 | C | C | E | D |
| 7.0 | C | C | E | D |
| 24 | C | D | F | H |
| 48 | D | E | G | H |
| 72 | D | F | H | H |
| 96 | D | G | H | H |
| 168 | D | H | I | I |
| 300 | D | H | I | I |
| 600 | D | H | I | I |

EXAMPLE 2

| Crosslinking Agent: | $AlCl_3$ |
| --- | --- |
| % Hydrolysis: | 0.6 |
| Polymer MW: | 5,000,000 |
| Polymer Conc: | 20,000 |
| Polymer pH: | 6.0 |
| Temp: | 22 |

| | Run Number | | | |
| --- | --- | --- | --- | --- |
| | 1 | 2 | 3 | 4 |
| Weight Ratio Polymer:Ions | 3 | 9 | 27 | 81 |
| Time | Gel Code | | | |
| 0. | A | A | A | A |
| 0.25 | A | A | A | A |
| 0.50 | C | C | C | C |
| 1.0 | C | C | C | C |
| 2.0 | C | D | E | E |
| 3.0 | C | G | F | F |
| 4.0 | C | G | H | F |
| 5.0 | C | H | H | F |
| 6.0 | C | H | H | F |
| 7.0 | C | H | H | F |
| 24 | C | H | I | H |
| 48 | D | H | I | H |
| 96 | E | I | I | I |
| 192 | E | I | I | I |
| 432 | E | I | I | I |

EXAMPLE 3

| Crosslinking Agent: | $Al(NO_3)_3$ |
| --- | --- |
| % Hydrolysis: | 0.6 |
| Polymer MW: | 5,000,000 |
| Polymer Conc: | 20,000 |
| Polymer pH: | 6.0 |
| Temp: | 22 |

| | Run Number | | | |
| --- | --- | --- | --- | --- |
| | 1 | 2 | 3 | 4 |
| Weight Ratio Polymer:Ions | 3 | 9 | 27 | 81 |
| Time | Gel Code | | | |
| 0. | A | A | A | A |
| 0.25 | A | A | A | A |
| 0.50 | D | E | E | C |
| 1.0 | D | E | G | C |
| 2.0 | D | F | F | D |
| 3.0 | E | G | H | E |
| 4.0 | E | H | I | E |
| 5.0 | E | H | I | F |
| 6.0 | E | H | I | F |
| 7.0 | F | H | I | G |
| 24 | F | I | I | G |
| 48 | F | I | I | G |
| 96 | F | I | I | G |
| 192 | F | I | I | G |
| 432 | F | I | I | G |

EXAMPLE 4

| Crosslinking Agent: | acidic $ZrAc_2$ |
| --- | --- |
| % Hydrolysis: | 0.6 |
| Polymer MW: | 5,000,000 |
| Polymer Conc: | 20,000 |
| Polymer pH: | 6.0 |
| Temp: | 22 |

| | Run Number | | | |
| --- | --- | --- | --- | --- |
| | 1 | 2 | 3 | 4 |
| Weight Ratio Polymer:Ions | 3 | 9 | 27 | 81 |
| Time | Gel Code | | | |
| 0. | A | A | A | A |
| 0.25 | E | E | E | C |
| 0.50 | F | F | E | C |
| 1.0 | G | H | F | C |
| 2.0 | H | I | F | C |
| 3.0 | I | I | G | C |
| 4.0 | I | I | H | C |
| 5.0 | I | I | H | C |
| 6.0 | I | I | I | D |
| 7.0 | I | I | I | D |
| 24 | I | I | I | E |
| 48 | I | I | I | E |
| 96 | I | I | I | E |
| 192 | I | I | I | F |
| 432 | I | J | I | F |

EXAMPLE 5

| Crosslinking Agent: | $Cr(NO_3)_3$ |
| --- | --- |
| % Hydrolysis: | 0.6 |
| Polymer MW: | 5,000,000 |
| Polymer Conc: | 20,000 |
| Polymer pH: | 6.0 |
| Temp: | 22 |

| | Run Number | | | |
| --- | --- | --- | --- | --- |
| | 1 | 2 | 3 | 4 |
| Weight Ratio Polymer:Ions | 3 | 9 | 27 | 81 |
| Time | Gel Code | | | |
| 0. | A | A | A | A |

-continued

| | | | | |
|---|---|---|---|---|
| 0.25 | C | C | C | C |
| 0.50 | E | F | F | E |
| 1.0 | F | H | H | G |
| 2.0 | H | H | I | H |
| 3.0 | H | H | I | H |
| 4.0 | H | I | I | H |
| 5.0 | H | I | I | I |
| 6.0 | H | I | I | I |
| 7.0 | H | I | I | I |
| 24 | H | I | J | I |
| 48 | I | I | J | I |
| 96 | I | I | J | I |
| 192 | I | I | J | I |
| 432 | I | I | J | I |

EXAMPLE 6

| Crosslinking Agent: | CrCl$_3$ |
|---|---|
| % Hydrolysis: | 0.6 |
| Polymer MW: | 5,000,000 |
| Polymer Conc: | 20,000 |
| Polymer pH: | 6.0 |
| Temp: | |

| | Run Number | | | |
|---|---|---|---|---|
| | 1 | 2 | 3 | 4 |
| Weight Ratio Polymer:Ions | 3 | 9 | 27 | 81 |
| Time | Gel Code | | | |
| 0. | A | A | A | A |
| 0.25 | C | C | C | C |
| 0.50 | D | E | F | E |
| 1.0 | E | H | H | H |
| 2.0 | F | H | I | I |
| 3.0 | F | H | I | I |
| 4.0 | G | H | I | I |
| 5.0 | G | I | I | I |
| 6.0 | G | I | I | I |
| 7.0 | G | I | I | I |
| 24 | H | I | J | I |
| 48 | H | I | J | I |
| 96 | I | I | J | I |
| 192 | I | I | J | I |
| 432 | I | I | J | I |

EXAMPLE 7

| Crosslinking Agent: | CrAc$_3$ |
|---|---|
| % Hydrolysis: | 0.6 |
| Polymer MW: | 5,000,000 |
| Polymer Conc: | 20,000 |
| Polymer pH: | 6.0 |
| Temp: | 22 |

| | Run Number | | | |
|---|---|---|---|---|
| | 1 | 2 | 3 | 4 |
| Weight Ratio Polymer:Ions | 3 | 9 | 27 | 81 |
| Time | Gel Code | | | |
| 0. | B | A | A | A |
| 0.25 | D | A | A | A |
| 0.50 | E | C | A | A |
| 1.0 | E | C | B | A |
| 2.0 | E | C | C | B |
| 3.0 | F | C | C | B |
| 4.0 | F | D | C | C |
| 5.0 | F | E | D | C |
| 6.0 | F | E | D | C |
| 7.0 | F | E | D | C |
| 24 | G | G | G | F |
| 48 | H | H | H | H |
| 96 | H | H | H | H |
| 192 | I | I | I | I |
| 432 | I | I | I | I |

EXAMPLE 8

| % Hydrolysis: | 30 |
|---|---|
| Polymer MW: | 5,000,000 |
| Polymer Conc: | 20,000 |
| Polymer pH: | 7.0 |
| Temp: | 22 |

| | Run Number | | | | | | |
|---|---|---|---|---|---|---|---|
| | 1 | 2 | 3 | 4 | 5 | 6 | 7 |
| Crosslinking Agent | Al$_2$(SO$_4$)$_3$ | AlCl$_3$ | Al(NO$_3$)$_3$ | CrCl$_3$ | Cr(NO$_3$)$_3$ | CrAc$_3$ | ZrAc$_2$ |
| Weight Ratio Polymer:Ions | 27 | 27 | 27 | 27 | 27 | 27 | 27 |
| Time | Gel Code | | | | | | |
| 0. | A | A | A | A | A | A | A |
| 0.25 | A | A | A | A | A | A | A |
| 0.50 | A | A | A | A | A | A | A |
| 1.0 | A | A | A | A | A | A | A |
| 2.0 | A | A | A | A | A | B | A |
| 3.0 | A | A | A | A | A | C | A |
| 4.0 | A | A | A | A | A | D | A |
| 24 | A | A | A | A | A | G | A |
| 96 | A | A | A | A | A | I | A |
| 168 | A | A | A | A | A | J | A |
| 336 | A | A | A | A | A | J | A |

Local gel balls prevent continuous gel formation in Runs 1-5, 7 and 8.

The results of Examples 1-7 indicate the use of a polyacrylamide having a limited degree of hydrolysis according to the present invention enables effective delayed continuous gel formation with polyvalent metal crosslinking agents. By comparison, Example 8 using 30% hydrolyzed polyacrylamide and the same crosslinking agents produces undesirable gel balls rather than continuous gels in almost every case due to rapid uncontrolled gelation.

EXAMPLE 9

| Crosslinking Agent: | CrAc$_3$ |
|---|---|
| Polymer MW: | 11,000,000 |

-continued

| | | |
|---|---|---|
| Polymer Conc: | 12,500 | |
| Temp: | 40 | |
| Weight Ratio Polymer:Ions: | 20 | |
| Pressure: | 3400 | |

| | Run Number | |
|---|---|---|
| | 1 | 2 |
| % Hydrolysis | 30 | <1 |
| Polymer pH | 10 | 9 |
| Time | Viscosity | |
| 0 | 190,000 | 8,000 |
| 0.1 | 255,000 | 10,000 |
| 0.5 | 300,000 | 15,000 |
| 1 | 350,000 | 25,000 |
| 2 | 415,000 | 40,000 |
| 3 | 460,000 | 70,000 |
| 4 | 500,000 | 100,000 |
| 8 | 575,000 | 210,000 |
| 11 | 600,000 | 300,000 |
| 14 | 605,000 | 355,000 |
| 18 | 605,000 | 425,000 |
| 20 | 605,000 | 460,000 |
| 36 | 605,000 | 610,000 |

FIG. 1 is a graphical representation of the data of Example 9.

EXAMPLE 10

| | |
|---|---|
| Crosslinking Agent: | $CrAc_3$ |
| Polymer MW: | 5,000,000 |
| Polymer Conc: | 10,000 |
| Polymer pH: | 8.0 |
| Temp: | 22 |
| Metal Ion Conc: | 207 |
| Total Ion Conc: | 990 |
| Weight Ratio Polymer:Ions: | 10 |

| | Run Number | |
|---|---|---|
| | 1 | 2 |
| % Hydrolysis: | 30 | <1 |
| Time | Gel Code | |
| 0.25 | B | A |
| 2.0 | B | A |
| 3.0 | C | A |
| 4.0 | C | A |
| 5.0 | C | B |
| 8.0 | E | B |
| 23 | F | B |
| 48 | E | B |
| 72 | F | B |
| 103 | F | B |
| 268 | G | B |

The data of Examples 9 and 10 show that the rate of gelation of 30% hydrolyzed polyacrylamide is considerably faster than that of polyacrylamide having a degree of hydrolysis below 1%. The data support the operability of the present invention.

EXAMPLE 11

| | |
|---|---|
| Crosslinking Agent: | $CrAc_3$ |
| Polymer MW: | 5,000,000 |
| Polymer Conc: | 20,000 |
| Temp: | 22 |
| Metal Ion Conc: | 225 |
| Weight Ratio Polymer:Ions: | 20 |

| | Run Number | | |
|---|---|---|---|
| | 1 | 2 | 3 |
| % Hydrolysis | <0.1 | 2.5 | 30 |
| Time | Gel Code | | |
| 0.5 | A | C | C |
| 1.0 | A | F | E |
| 2.0 | A | G | F |
| 3.0 | A | H | G |
| 4.0 | A | I | I |
| 5.0 | A | J | I |
| 6.0 | A | J | J |
| 7.0 | A | J | J |
| 24 | A | J | J |
| 48 | A | J | J |
| 96 | A | J | J |
| 168 | A | J | J |
| 300 | A | J | J |
| 672 | A | J | J |
| 1680 | A | J | J |

Example 11 shows the functional relation between the degree of hydrolysis in the polyacrylamide and the gelation rate. The gelation rate increases as the degree of hydrolysis increases up to a maximum which is about 2.5% in the present case.

FIGS. 2 and 3 are quantitative representations of the same functional relationship shown qualitatively in Examples 10 and 11. The crosslinking conditions in FIGS. 2 and 3 are the same as Example 11 with the following exceptions. The temperature of FIG. 2 is 100° C. and the temperature of FIG. 3 is 110° C. The polymer in FIG. 2 has a molecular weight of 5,000,000 and the polymer of FIG. 3 has a molecular weight of 11,000,000. In both cases, the gelation solutions are gelled at about 3400 kPa under anaerobic conditions.

The results of FIGS. 2 and 3 indicate the present invention is effective even in relatively high temperature formations.

While the foregoing preferred embodiments of the invention have been described and shown, it is understood that alternatives and modifications, such as those suggested and others, may be made thereto and follow in the scope of the invention.

I claim:

1. A process for delaying the gelation rate of a gelation solution to form a continuous crosslinked polymer gel utilized for a hydrocarbon recovery application in a treatment region of a hydrocarbon-bearing formation below an earthen surface penetrated by a wellbore in communication with said region, the process comprising the steps of:
   (a) predetermining a delayed gelation rate required of said continuous crosslinked polymer gel to perform said hydrocarbon recovery application;
   (b) preparing a chromic carboxylate complex in a solution consisting essentially of a solvent, at least one chromic species, and at least one acetate species, said complex capable of crosslinking a polyacrylamide;
   (c) preselecting said polyacrylamide wherein the degree of hydrolysis of amide groups to carboxylate groups in said polyacrylamide is less than about 5.0% such that said preselected polyacrylamide gels at said predetermined delayed gelation rate when admixed with said complex in solution;
   (d) preparing said gelation solution at said earthen surface by admixing said preselected polyacrylamide and said complex in solution;
   (e) injecting said gelation solution into said treatment region via said wellbore; and
   (f) forming said continuous crosslinked polymer gel in situ from said gelation solution at said predetermined delayed gelation rate required to perform said hydrocarbon recovery application.

2. The process of claim 1 wherein said hydrocarbon recovery application is conformance improvement and comprises substantially plugging said treatment region.

3. The process of claim 2 wherein said treatment region is an anomaly in said hydrocarbon-bearing formation.

4. The process of claim 3 wherein said anomaly is a fracture or a fracture network.

5. The process of claim 2 wherein said treatment region is a matrix in said hydrocarbon-bearing formation.

6. The process of claim 1 wherein said hydrocarbon recovery application is wellbore cementing and said polymer gel is a cement.

7. The process of claim 1 wherein said degree of hydrolysis is less than about 3.5%.

8. The process of claim 1 wherein said degree of hydrolysis is less than about 1.0%.

9. The process of claim 1 wherein said gelation solution is partially gelled upon injection into said treatment region.

10. The process of claim 1 wherein said wellbore is a hydrocarbon production wellbore and said gel substantially reduces the water to hydrocarbon ratio of fluid produced from said wellbore.

11. The process of claim 1 wherein said wellbore is a hydrocarbon production wellbore and said gel substantially increases hydrocarbon productivity from said well bore.

12. The process of claim 1 wherein said wellbore is an injection wellbore.

13. The process of claim 1 wherein said hydrocarbon recovery application is formation fracturing and said polymer gel is a fracturing fluid.

14. The process of claim 1 wherein the temperature of said formation is greater than about 38° C.

15. The process of claim 1 wherein the temperature of said formation is greater than or equal to 100° C.

16. A process for delaying the gelation rate of a gelation solution to form a continuous crosslinked polymer gel utilized for hydrocarbon recovery application in a treatment region of a hydrocarbon-bearing formation below an earthen surface penetrated by a wellbore in communication with said region, the process comprising the steps of:

(a) predetermining a delayed gelation rate required of said continuous crosslinked polymer gel to perform said hydrocarbon recovery application;

(b) preparing a chromic carboxylate complex in a solution consisting essentially of a solvent, at least one chromic species, at least one acetate species, and at least one species selected from the group consisting of electronegative oxygen species, electronegative hydroxide species, inorganic monovalent ions, inorganic divalent ions, water molecules, and mixtures thereof, and a solvent, said complex capable of crosslinking a polyacrylamide;

(c) preselecting said polyacrylamide wherein the degree of hydrolysis of amide groups to carboxylate groups in said polyacrylamide is less than about 5.0% such that said preselected polyacrylamide gels at said predetermined delayed gelation rate when admixed with said complex in solution;

(d) preparing said gelation solution at said earthen surface by admixing said preselected polyacrylamide and said complex in solution;

(e) injecting said gelation solution into said treatment region via said wellbore; and (f) forming said continuous crosslinked polymer gel in situ from said gelation solution at said predetermined delayed gelation rate required to perform said hydrocarbon recovery application.

17. The process of claim 16 wherein said hydrocarbon recovery application is conformance improvement and comprises substantially plugging said treatment region.

18. The process of claim 17 wherein said treatment region is an anomaly in said hydrocarbon-bearing formation.

19. The process of claim 18 wherein said anomaly is a fracture or a fracture network.

20. The process of claim 17 wherein said treatment region is a matrix in said hydrocarbon-bearing formation.

21. The process of claim 16 wherein said hydrocarbon recovery application is wellbore cementing and said polymer gel is a cement.

22. The process of claim 16 wherein said degree of hydrolysis is less than about 3.5%.

23. The process of claim 16 wherein said degree of hydrolysis is less than about 1.0%.

24. The process of claim 16 wherein said gelation solution is partially gelled upon injection into said treatment region.

25. The process of claim 16 wherein said wellbore is a hydrocarbon production wellbore and said gel substantially reduces the water to hydrocarbon ratio of fluid produced from said wellbore.

26. The process of claim 16 wherein said wellbore is a hydrocarbon production wellbore and said gel substantially increases hydrocarbon productivity from said wellbore.

27. The process of claim 16 wherein said wellbore is an injection wellbore.

28. The process of claim 16 wherein said hydrocarbon recovery application is formation fracturing and said polymer gel is a fracturing fluid.

29. The process of claim 16 wherein the temperature of said formation is greater than about 33° C.

30. The process of claim 16 wherein the temperature of said formation is greater than or equal to about 100° C.

* * * * *

UNITED STATES PATENT AND TRADEMARK OFFICE
CERTIFICATE OF CORRECTION

PATENT NO. : 4,744,418

DATED : May 17, 1988

INVENTOR(S) : Robert D. Sydansk

It is certified that error appears in the above-identified patent and that said Letters Patent is hereby corrected as shown below:

Col. 4, lines 61 & 62: Delete "chromium II" and insert --chromium III--.
Col. 4, line 63: Delete "moe" and insert --more--.
Col. 6, line 9: Delete "that" and insert --than--.
Col. 7, line 44: Delete "another" and insert --other--.
Col. 11, line 23: Across from "Temp:" insert --22--.

Signed and Sealed this

Twenty-seventh Day of September, 1988

Attest:

DONALD J. QUIGG

*Attesting Officer*      *Commissioner of Patents and Trademarks*